United States Patent [19]

Oka

[11] Patent Number: 5,594,745
[45] Date of Patent: Jan. 14, 1997

[54] LASER LIGHT GENERATING APPARATUS

[75] Inventor: Michio Oka, Kanagawa, Japan

[73] Assignee: Sony Corporation, Tokyo, Japan

[21] Appl. No.: 413,741

[22] Filed: Mar. 30, 1995

[30] Foreign Application Priority Data

Mar. 30, 1994 [JP] Japan .................................. 6-061084

[51] Int. Cl.⁶ ........................................................ H01S 3/10
[52] U.S. Cl. .............................. 372/21; 372/22; 372/93; 372/97
[58] Field of Search .................... 372/21, 22, 38, 372/93, 97

[56] References Cited

U.S. PATENT DOCUMENTS

| | | | |
|---|---|---|---|
| 4,338,578 | 7/1982 | Sukhman | 372/97 |
| 5,134,622 | 7/1992 | Deacon | 372/22 |
| 5,247,529 | 9/1993 | Heidemann | 372/22 |
| 5,367,531 | 11/1994 | Eguchi et al. | 372/22 |
| 5,381,230 | 1/1995 | Blake et al. | 385/14 |
| 5,418,810 | 5/1995 | Eguchi et al. | 372/22 |

FOREIGN PATENT DOCUMENTS 5-243661  9/1993  Japan .

Primary Examiner—Rodney B. Bovernick
Assistant Examiner—Robert E. Wise
Attorney, Agent, or Firm—Charles M. Fish, Esq.; Pasquale Musacchio, Esq.; Jerry A. Miller

[57] ABSTRACT

A laser light generating apparatus has a first light source generating a light beam of a fundamental wavelength, a resonator made up of a plurality of reflection devices having high reflectance with respect to the fundamental wavelength of the light beam and a non-linear optical crystal element located within the resonator and generating a light beam of harmonic when the light beam of the fundamental wavelength is input thereto. Further, the laser light generating apparatus an amplifier element located within the resonator and amplifying the light beam of the fundamental wavelength therein and an energy source for exciting the amplifier element.

12 Claims, 4 Drawing Sheets

LASER LIGHT GENERATING APPARATUS

FIELD OF THE INVENTION

The present invention relates to a laser light generating apparatus. More particularly, the present invention relates to a laser light generating apparatus for generating the laser light of higher harmonics using a non-linear optical crystal element.

BACKGROUND

The conversion of a wavelength through use of high power density within a resonator has been proposed. For example, an external resonator type second harmonics generator (SHG) has been proposed in addition to an alternate type of second harmonics generator known as internal resonator type SHG which uses a non-linear optical crystal element within a resonator having a light source. As an example of the external resonator type SHG, Japanese Laid Open Patent H5-243361 (1993) discloses a SHG using beta barium borate (BBO) as a non-linear optical crystal element. Also known is an internal resonator type SHG using potassium titanyl phosphate (KTiOPO$_4$) or KTP as a non-linear optical crystal element. In the external or internal resonator type SHG, the laser light of the second harmonics can be efficiently output by phase-matching the laser light of the second harmonics with respect to the laser light of the fundamental frequency.

The conversion efficiency in a second harmonics generator is explained as follows:

FIG. 2 shows an apparatus for generating second harmonics by an external type resonator. A light source 11 generates a laser light having a fundamental frequency. The laser light is radiated to an external type resonator 30 through a phase modulator 12 for producing a frequency error signal. Further, the laser light is transmitted through a lens system 13 for mode matching to the external resonator 30. The external resonator 30 is made up of two concave mirrors 18 and 19 and a plane mirror 20 having design parameters as shown in Table 1.

TABLE 1

|  | Radius of Curvature | Reflectance R Fundamental Wavelength (532 nm) | Transmittance T SHG light (266 nm) |
| --- | --- | --- | --- |
| Mirror 18 | 50 mm | 99.0% | — |
| Mirror 19 | 50 mm | 99.9% | 90% or more |
| Mirror 20 | Flat | 99.9% | — |

An electro-magnetic actuator 16 is employed for positioning the mirror 18. A non-linear optical crystal element 17 fabricated from BBO is placed within the resonator 30. The laser light of the fundamental frequency, reflected by the resonator 30, is detected by a photodetector 14. The electro-magnetic actuator 16 is position-controlled by a control circuit 15, using a detection signal of the light detector 14. Thereby, the incident light resonates with the resonator length to efficiently produce a laser light of second harmonics by the non-linear optical crystal element 17. Japanese Laid Open Patent H5-243661 (1993) discloses that the electro-magnetic actuator is position-controlled by servo control. The Japanese patent discloses that a detection signal of a reflected light from the photodetector 14 and a modulated signal for driving the phase modulator 12 are synchronously detected and passed through a low-pass filter to produce an error signal indicating an error of an optical path length of the resonator. Then, the electromagnetic actuator 16 is driven by the error signal for moving the mirror 18 in the direction of the optical axis until the error signal becomes zero.

The SHG conversion efficiency $\eta_{SH}$ is found by the following Equation (1).

$$\eta_{SH} = \gamma_{SH} P_c \quad (1)$$

Here, $\gamma_{SH}$ is a non-linear conversion factor and Pc is the power incident to the resonator. A spot radius $\omega_0$ of BBO as an example of the non-linear optical crystal element 17 is calculated to be equal to 49 μm when the distance between the mirrors 16 and 20 is approximately 85 mm. Thus, for the crystal thickness of 3 mm, the non-linear conversion factor $\gamma_{SH}$ is found to be $1.5 \times 10^{-5}(W^{-1})$.

The internal power in the resonator 30 during resonation is multiplied by multiple reflection. Thus, the conversion efficiency may be expected to be improved by placing a non-linear optical crystal element within the resonator 30.

The multiplication factor may be found from the Fabry-Perot's equation of multiple reflection. Thus, the amplitude reflection ratio r may be found from the following Equation (2), when $R_1$ is the reflectance of an incident mirror 18 and $R_m$ is the reflectance of the outgoing light inclusive of the round trip loss within the resonator 30 and the reflectance of the mirrors 19 and 20.

$$r = \frac{\sqrt{R_1} - e^{i\Delta}\sqrt{R_m}}{1 - e^{i\Delta}\sqrt{R_1 \cdot R_m}} \quad (2)$$

The amplitude multiplication factor tc within the resonator 30 is found from the following Equation (3).

$$t_c = \frac{\sqrt{T_1}}{1 - e^{i\Delta}\sqrt{R_1 \cdot R_m}} \quad (3)$$

Here, $\Delta$ is the round trip phase difference and $T_1 = 1 - R_1$.

From the above Equations (2) and (3), the intensity reflection ratio R my be found by the following Equation (4)

$$R = \frac{(\sqrt{R_1} - \sqrt{R_m})^2 + 4\sqrt{R_1 \cdot R_m}\left(\sin\frac{\Delta}{2}\right)^2}{(1 - \sqrt{R_1 \cdot R_m})^2 + 4\sqrt{R_1 \cdot R_m}\left(\sin\frac{\Delta}{2}\right)^2} \quad (4)$$

The intensity multiplication factor Tc is found by the following Equation (5).

$$T_c = \frac{T_1}{(1 - \sqrt{R_1 \cdot R_m})^2 + 4\sqrt{R_1 \cdot R_m}\left(\sin\frac{\Delta}{2}\right)^2} \quad (5)$$

For $R_1 = R_m$ and $R_2 = 1$, that is when the total loss including the loss by SHG within the resonator is equal to the incident transmittance, the reflectance during resonation becomes zero, such that all the energy of the incident light is input to the resonator. This state is termed an impedance-matched state. Since $R_1 = R_m$, $R_2 = 1$ and $T_1 = 1 - R_m$ for $\Delta = 2$ mπ, the intensity multiplication factor $T_c$ during the impedance-matched state is found from the following Equation (6).

$$T_c = \frac{P_c}{P_i} = \frac{1}{1 - R_m} \quad (6)$$

Here, $P_i$ is the incident power and $P_c$ is the power within the resonator.

Substituting Rm=99%, it is found that the 100 times multiplication effect may be achieved. Next, the SHG conversion efficiency in this state is scrutinized. If the SHG conversion efficiency is regarded as being an increase in the loss within the resonator, it is found from Equation (7).

$$R_m = 1 - \delta_{cav} - \eta_{SH} \qquad (7)$$

Here, $R_m$ is the reflectance at the outgoing light side (towards rear), $\delta_{cav}$ is the loss within the resonator and $\eta_{SH}$ is the SHG conversion efficiency for a single pass.

Substituting the Equation (7) into the Equation (6), a quadratic Equation (8) concerning the internal power $P_c$ $$P_c = \frac{P_i}{\delta_{cav} + \gamma_{SH} P_c} \qquad (8)$$

is obtained.

The power within the resonator $P_c$ is found from the following Equation (9).

$$P_c = \frac{\sqrt{\delta_{cav}^2 + 4\gamma_{SH} P_i} - \delta_{cav}}{2\gamma_{SH}} \qquad (9)$$

Thus, the effective SHG conversion efficiency $\eta$ for the incident power may be found from the following Equation (10).

$$\eta = \frac{\gamma_{SH} P_c^2}{P_i} = 1 - \frac{\sqrt{1+2X} - 1}{X} \qquad (10)$$

Here, X is represented by the following Equation (11).

$$X = \frac{2\gamma_{SH} P_i}{\gamma_{cav}^2} \qquad (11)$$

If the non-linear optical crystal element 17 is fabricated from BBO as an example, the crystal thickness is 3 mm and the spot radius is 49 μm, $\gamma_{SH}=1.5\times10^{-5}$ ($W^{-1}$). Substituting the input power $P_i=1$ W and the resonator loss $\delta_{cav}=0.5\%$ into the Equations (11) and (12), it may be seen that the conversion efficiency amounts to about 30%. Unless impedance matching is achieved, the conversion efficiency may be found as the numerical solution by substituting the above Equation (7) into the Equation (5).

Although the conversion efficiency of approximately 30% represents significant improvement over that of the single-pass SHG, the remaining 70% represents heat which is wastefully consumed. In addition, there is raised a problem that the conversion efficiency is changed significantly with changes in the value of the resonator losses.

If the Equation (10) is rewritten using the Equations (1) and (8), the Equation (12) is obtained.

$$\eta = \frac{\gamma_{SH} P_c^2}{P_i} = \frac{\eta_{SH}}{\delta_{cav} + \eta_{SH}} \qquad (12)$$

Since the resonator loss is the diffusion and absorption by the mirror or the non-linear optical crystal element, it is impossible to reduce the resonator loss to zero. Consequently, as long as the resonator loss exists, it is impossible to get 100% conversion efficiency. In addition, if the value of the resonator loss is changed, the conversion efficiency is changed significantly. The SHG conversion efficiency within the SHG of the internal type resonator is similar to that of the SHG of the external type resonator.

The above-described SHG laser source of the external resonation type or the SHG laser light source by the non-linear optical crystal element within the laser resonator (the SHG of the internal resonator type) have several disadvantages. One disadvantage is that resonator loss results in less than 100% conversion. A second disadvantage is that the conversion efficiency is significantly changed by fluctuations in resonator loss.

SUMMARY OF THE INVENTION

One object of the present invention is to provide an improved laser light generating apparatus.

According to the present invention, a laser light generating apparatus has a first light source generating a light beam of a fundamental wavelength, a resonator made up of a plurality of reflection devices having high reflectance with respect to the fundamental wavelength of the light beam and a non-linear optical crystal element located within the resonator and generating a light beam of harmonic when the light beam of the fundamental wavelength is input thereto. Further, the laser light generating apparatus has an amplifier dement located within the resonator and amplifying the light beam of the fundamental wavelength therein and an energy source for exciting the amplifier element.

DESCRIPTION OF THE INVENTION

Referring to drawings, the present invention will be explained in detail.

Figure 1:
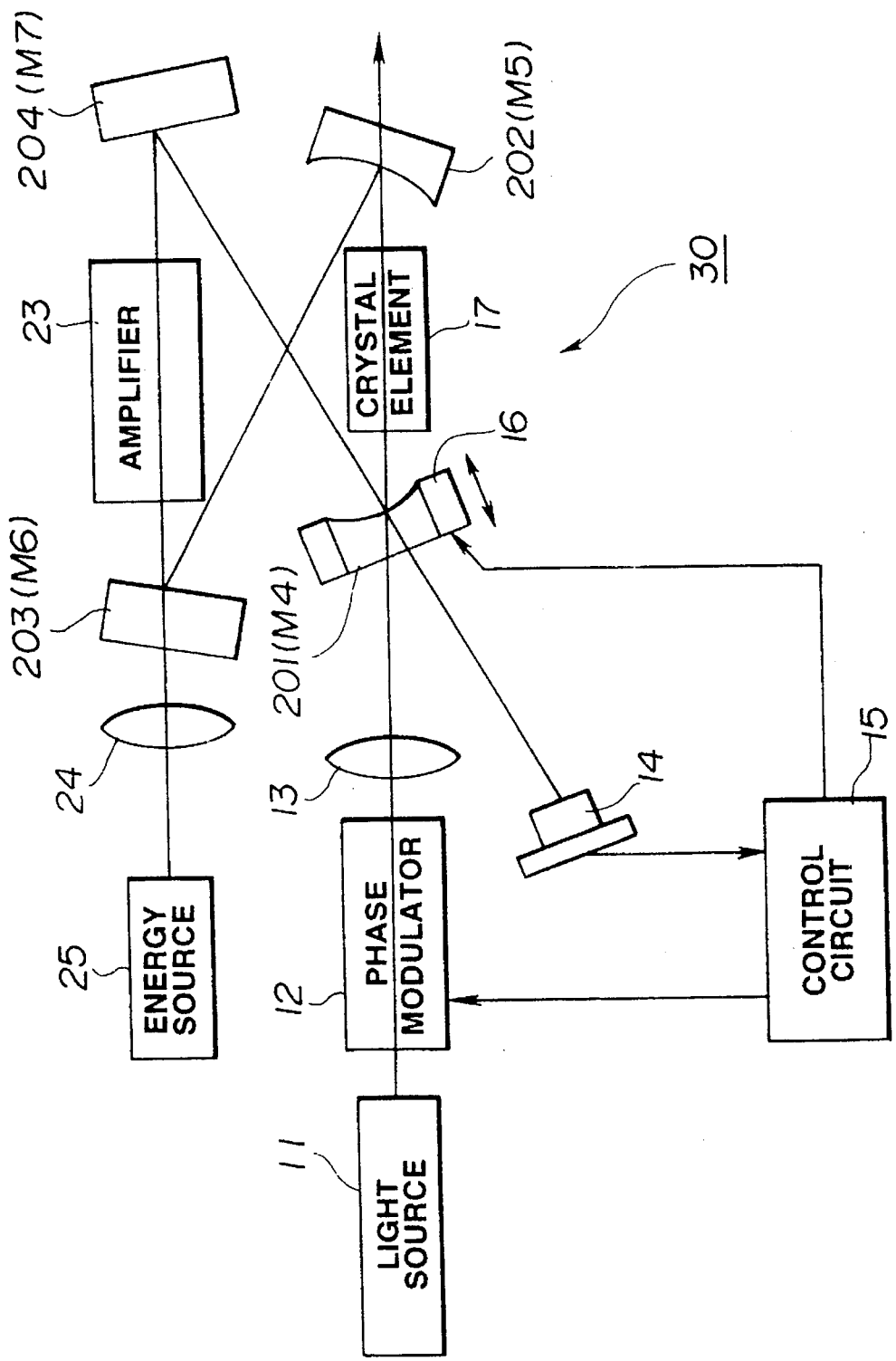
FIG. 1 is a schematic view showing an external resonator type SHG laser light generating apparatus according to an embodiment of the present invention.

The schematic view of the first embodiment of the present invention is shown in FIG. 1.

In this figure, the laser light of the fundamental frequency from a fundamental frequency laser light source 11 is phase-modulated by a phase modulator 12 adapted for producing a frequency error signal. The phase-modulated laser light is incident on an external resonator 30 via a lens system 13 which provides for mode matching to the external resonator. The external resonator 30 has a pair of concave mirrors 201, 202 and a pair of plane mirrors 203, 204 as reflection means. The mirror 201 is positioned by an electromagnetic device or an electro-magnetic actuator 16. A non-linear optical crystal element 17 is located within the external resonator 30.

The laser light of the fundamental frequency, passed via the mirror 201 after reflection within the external resonator 30, is detected by a photodetector 14. The laser light of the second harmonics is efficiently produced by the non-linear optical crystal element 17 by position-controlling the electro-magnetic actuator 16 by a control circuit 15 for oscillating the incident light into resonation. The position-controlling method has already been disclosed in Japanese Laid Open Patent H5-243661. That is, the control circuit 15 performs servo control in the following manner. A modulation signal for driving a phase modulator 12 and a detection signal of the reflected light from the photodetector 14 are synchronously detected in the control circuit 15 and passed through a low-pass filter, not shown, to produce an error signal indicating an error in the optical path length of the resonator. The error signal is supplied via a driver, not shown, to the actuator 16 as its driving control signal to move the mirror 201 along the optical axis until the error signal is reduced to zero.

Further, an amplifier element 23 for amplifying the laser light of the fundamental frequency is located in the optical path of the external resonator 30. An output of an energy source 25 is supplied via a lens 24 to the amplifier element 23, whereby the amplifier element 23 is excited to produce the action of amplification.

An increment or gain in the light volume is represented by G, which is produced when the laser light of the fundamental frequency within the external resonator passes the amplifier 23 once. The increment or gain compensates the loss in the resonator so that the conversion efficiency represented by Equation (12) is improved. The gain G is a negative loss. When the gain G is added to the loss in the resonator, the Equation (12) is accordingly rewritten to the following Equation (13).

$$\eta = \frac{\gamma_{SH} P_c^2}{P_i} = \frac{\eta_{SH}}{\delta_{cav} - G + \eta_{SH}} \quad (13)$$

Consequently, if the gain G is equal to the loss within the resonator $\delta_{cav}$, the conversion efficiency for the light volume incident on the external resonator 30 becomes equal to 100%. In addition, if the gain G is larger than the loss within the resonator $\delta_{cav}$, the conversion efficiency for the light volume incident on the external resonator 30 may exceed 100%. This, however, is not in violation of the law of energy conservation on the whole because the energy needs to be supplied to the energy source 25 for producing the gain.

An experiment was conducted, using a neodymium doped yttrium aluminum garnet Nd:YAG laser oscillating at a wavelength of 1064 nm as a light source of a fundamental frequency 11, a Nd:YAG laser crystal as an amplifier 23 and a semiconductor laser as an energy source 25. The details and the results of the experiment are as follows.

The fundamental frequency laser light source 11 is a resonator having a Nd:YAG laser therein, which oscillates at a single longitudinal mode at a wavelength of 1064 nm. The maximum output of the fundamental frequency laser light source was 2 W. The mirror 201 of the external resonator 30 had light transmittance of 1.2% with respect to the laser light of the fundamental frequency with the wavelength of 1064 nm. The mirrors 202, 203 and 204 had the light reflectance of approximately 100% with respect to the fundamental frequency laser light of 1064 nm. The mirror 202 had light transmittance of approximately 100% with respect to the second harmonics laser light of 532 nm, while the mirror 203 had light transmittance of approximately 100% with respect to the light of 808 nm from the energy source 11. The design parameters for the respective mirrors are shown in the following Table 2.

TABLE 2

| | Radius of curvature | Reflectance R fundamental wavelength (1064 nm) | Transmittance T Exciting Light (808 nm) | Transmittance T SHG Light (532 nm) |
|---|---|---|---|---|
| Mirror 201 | 100 mm | 98.8% | — | — |
| Mirror 202 | 100 mm | 99.9% | — | 90% or more |
| Mirror 203 | Flat | 99.9% | 90% or more | — |
| Mirror 204 | Flat | 99.9% | — | — |

A high-output semiconductor laser, coupled to an optical fiber, was employed as the energy source 25. The light from the energy source was of a wavelength of 808 nm and an output of 2.5 W.

A non-linear optical crystal element 17 fabricated from KTP having a thickness of 5 mm was placed within the external resonator 30. The non-linear optical crystal element 17 was oriented for effecting type 2 phase matching of the fundamental frequency laser light of 1064 nm and had both its end faces coated so as not to be reflective with respect to the fundamental frequency laser light of 1064 nm and to the second harmonics laser light of 532 nm. Within the external resonator 30 was placed a Nd:YAG laser crystal having a thickness of 5 mm as the amplifier element 23 and had both its end faces coated so as not to be reflective with respect to the fundamental frequency laser light of 1064 nm and the light of 808 nm from the energy source 25.

The fundamental frequency laser light was incident on the mirror 201 having light transmittance of 1.2%. The laser light energy, which was theoretically 100% under the above-mentioned impedance-matched state, was incident on the external resonator 30. However, due to deviation of the actual light transmittance of the mirror 201 from the theoretical light transmittance and alignment errors, the actual coupling efficiency was approximately 75%.

Figure 3:
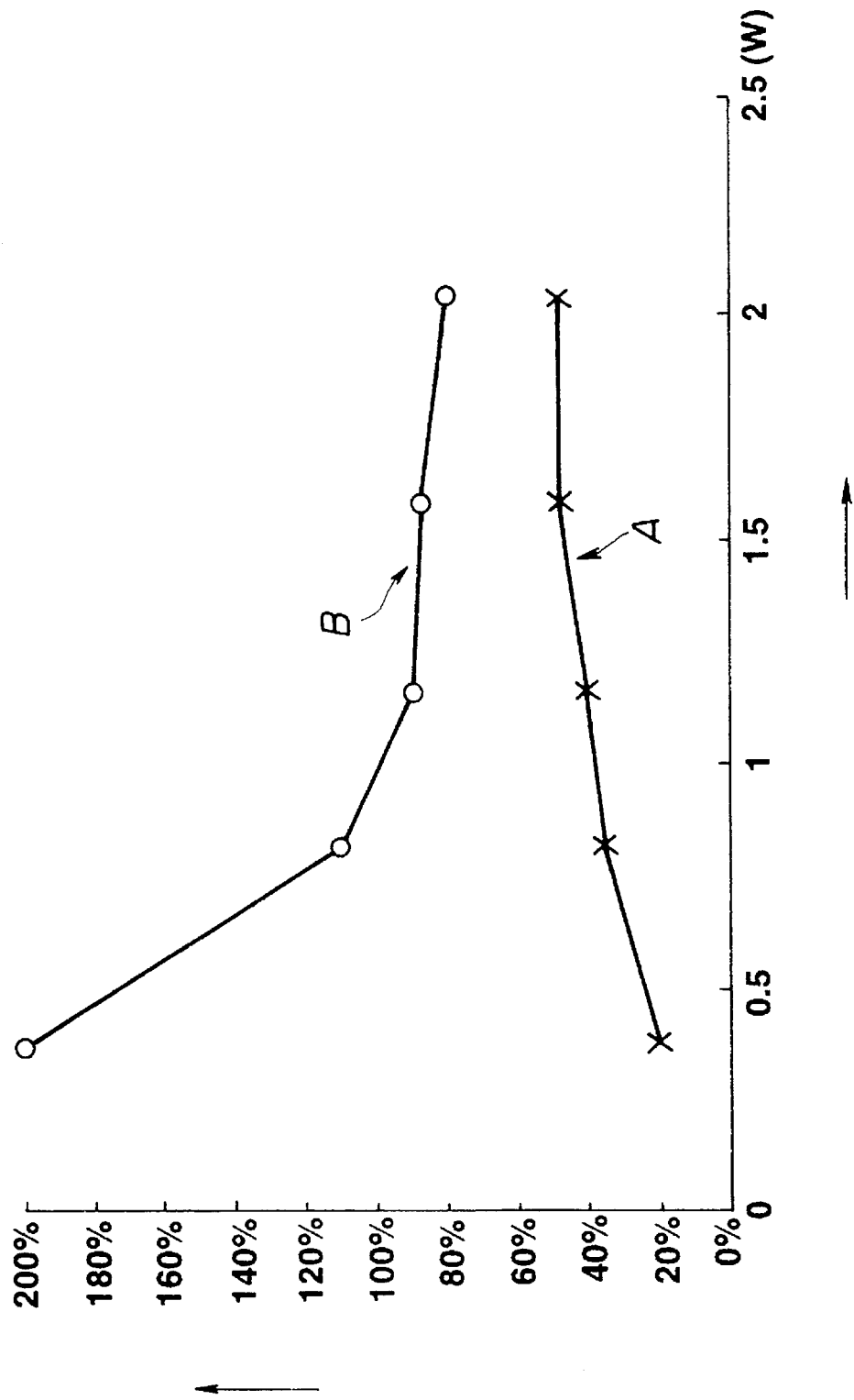
FIG. 3 is a graph showing the result of an experiment conducted on the laser light generating apparatus shown in FIG. 1.

The SHG conversion efficiency was measured when the amplifier was not exited. The result is indicated by a curve A interconnecting plot marks "x" in FIG. 3. The maximum conversion efficiency was obtained when the incident power was approximately 2 W. However, the conversion efficiency was 46% at most, while the remaining energy of the fundamental frequency laser light was wastefully consumed as the loss incurred within the resonator.

On the other hand, the SHG conversion efficiency was measured when the Nd:YAG laser crystal was used as the amplifier element 23 and exited by the semiconductor laser of an energy output of 2.5 W as the energy source 25. The conversion efficiency exceeding 100% could be obtained when the incident power was not higher than approximately 0.8 W, as indicated by a curve B interconnecting plot marks "o" in FIG. 3. The conversion efficiency amounting to approximately 80% could be achieved even for the incident power of approximately 2 W. That is, the conversion efficiency was nearly twice that in the absence of the energy from the energy source 25.

The above experimental results indicate that the losses induced in the resonator have been compensated by the gain of the amplifier 23 for thereby improving the conversion efficiency, as indicated by the above equation (13).

Figure 2:
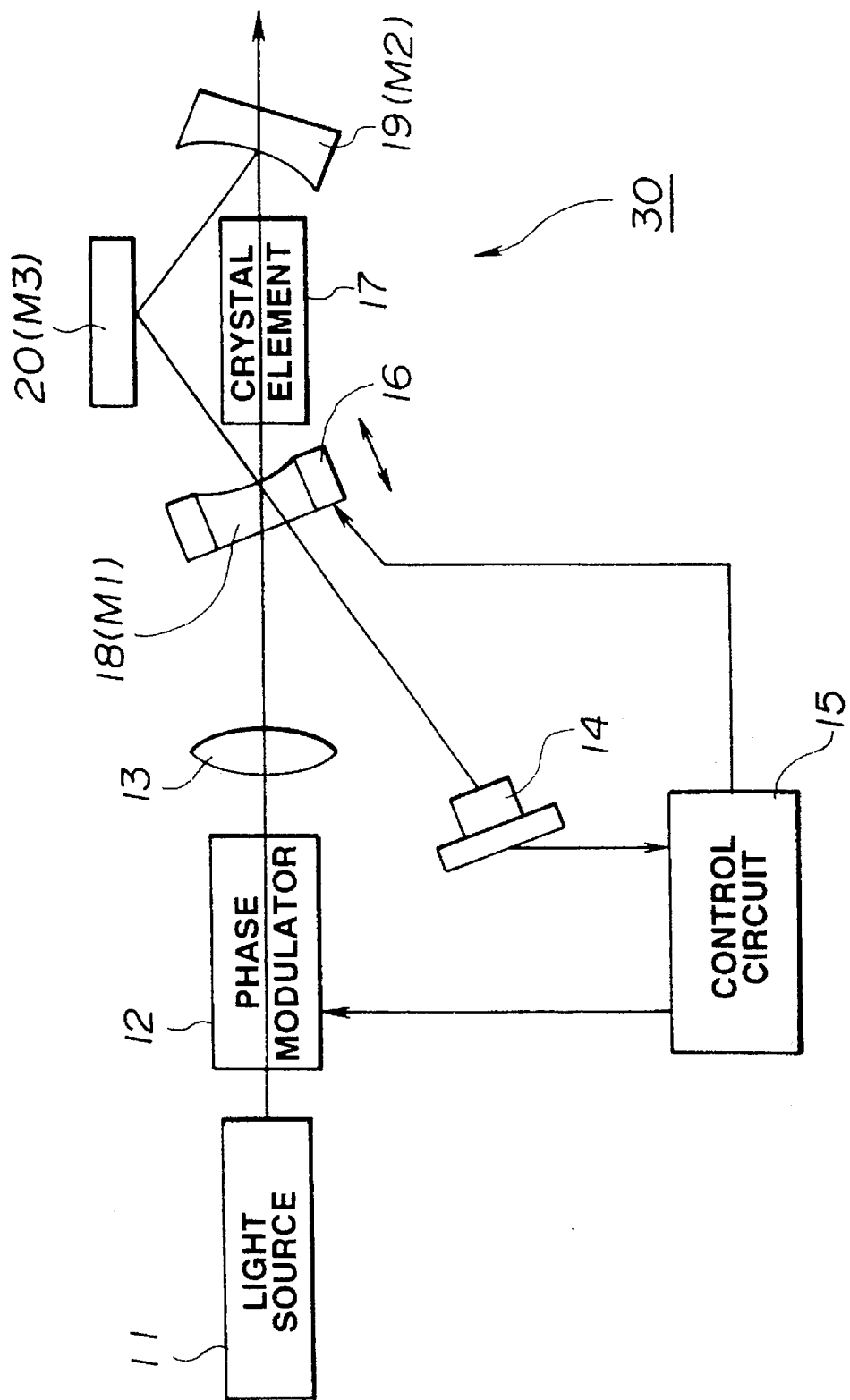
FIG. 2 is a schematic view showing a conventional external resonator type SHG laser generating apparatus.

The conversion efficiency exceeding 100% is achieved when the input power is lower than 1 W in FIG. 2. This, however, is not in violation of the law of energy conservation on the whole because the energy is required for the energy source 25. The conversion efficiency is further increased by increasing the power of the energy from the energy source 25.

Figure 4:
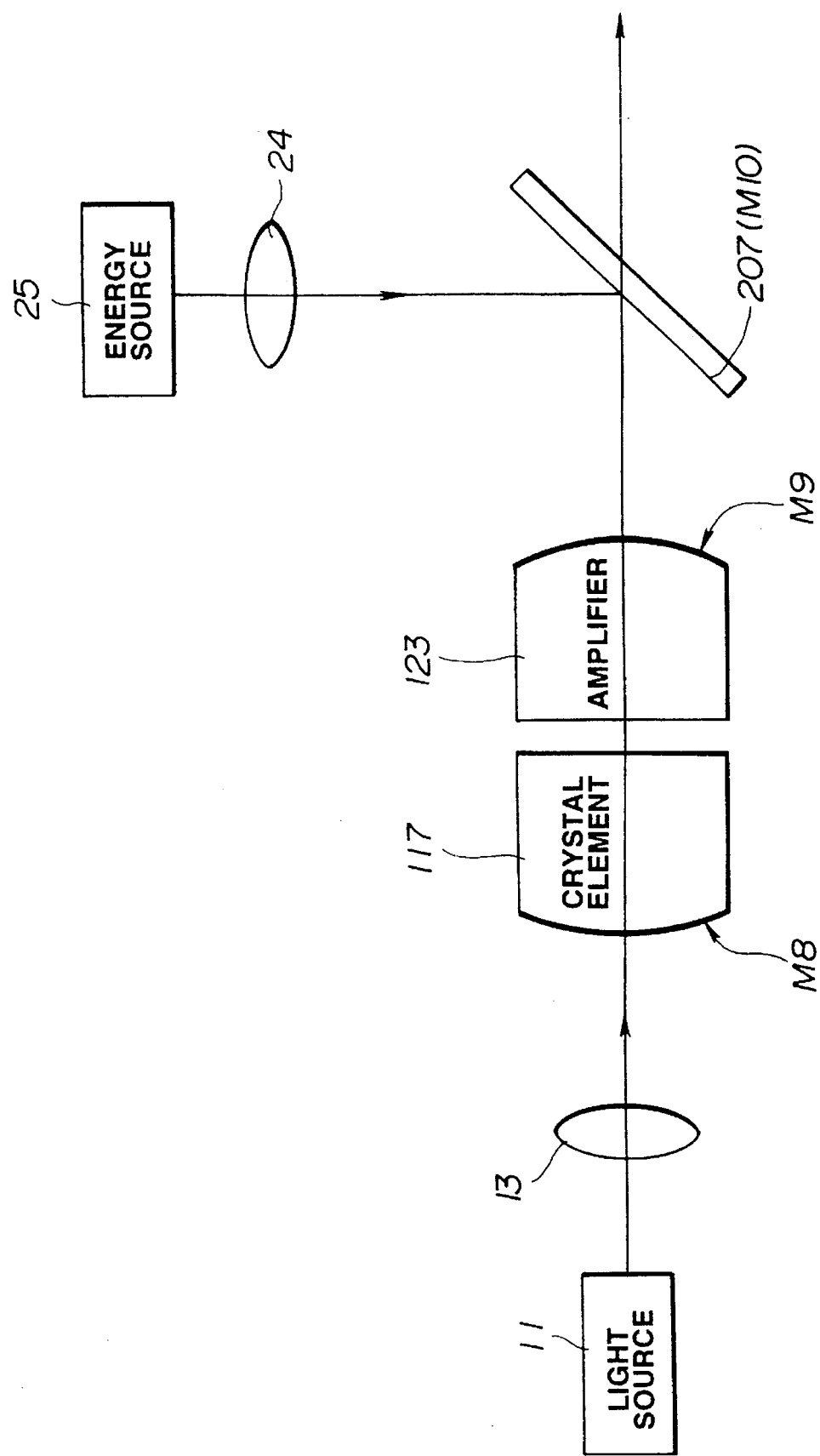
FIG. 4 is a schematic view showing an external resonator type SHG laser light generating apparatus according to another embodiment of the present invention.

Referring to FIG. 4, a modification of the present invention will be explained. In the present modification, the reflective mirrors as optical components are omitted by providing reflection function on the surface of the non-linear optical crystal element for generation of high harmonics and/or on the surface of the amplifier element acting for amplifying the fundamental frequency laser light to constitute a resonator. In the present modification, the fundamental frequency laser light source 11, lens system 13, energy source 25 and the lens 24 are the same as those shown and described in connection with FIG. 1.

In FIG. 4, a reflective surface M8 is formed on the surface of the non-linear optical crystal element 117, such as KTP, facing the fundamental frequency laser light source 11, that is, on the surface of the element 117 receiving the fundamental frequency laser light. On the other hand, a reflective surface M9 is formed on the outgoing surface of the amplifier 123 such as being formed of Nd:YAG. These reflective surfaces M8 and M9 form an external resonator. The reflective surfaces M8 and M9 are formed as concave mirrors, when viewed from the inside of the resonator.

The fundamental frequency laser light from the light source 11 is incident on the reflective surface M8 of the non-linear optical crystal element 117 of the external resonator via the lens system 13. The light from the energy source 25 falls on the reflective surface M9 of the amplifier 123 constituting the external resonator. The reflective mirror 207 has waveform selectivity so that it reflects the light from the energy source 25 and transmits the second harmonics laser light output from the external resonator.

With the present embodiment, similarly to the embodiment shown in FIG. 1, the amplifier element 123 provided within the inside of the external resonator for amplifying the fundamental frequency laser light compensates the resonator loss for increasing the conversion efficiency and for suppressing fluctuations in the conversion efficiency.

The present invention is not limited to the above-described embodiments. For example, the semiconductor laser or the gas laser may be employed, in place of a variety of solid-state laser, as the fundamental frequency laser light source. The present invention may naturally be employed for a laser light generating apparatus for generating fourth or higher-order harmonics using a laser light source generating the second harmonics laser light as the fundamental frequency laser light source.

In addition, the solid-state laser medium, such as neodymium doped yttrium orthovanadate (Nd:YVO$_4$) or neodymium doped lithium yttrium fluoride (Nd:YLF), or a laser medium generally exhibiting the action of amplification, may be employed as the laser medium acting as the amplifier, in addition to the Nd:YAG laser medium.

Although the semiconductor laser is used as the energy source for exciting the amplifier element in the above-described embodiments, it is possible to use any desired energy source capable of exciting the laser medium, such as lamp or current injection.

Although KTP is used in the above embodiments as an example of the non-linear optical crystal element, it is also possible to employ those non-linear optical crystal elements capable of generating second harmonics without regard to type I or II phase matching conditions, such as BBO, lithium niobate (LiNbO$_3$) lithium triborate (LBO) or potassium niobate (KN). The present invention may also be applied to non-linear optical processes, such as generation of the sum or differential frequency or parametric generation, in addition to the generation of second harmonics.

In addition, although the laser medium is used in the above embodiments as the amplifier element, it is also possible to employ the non-linear optical processes, such as second harmonic generation or parametric amplification. If the wavelength of the fundamental frequency laser light coincides with the wavelength of the second harmonics produced by the non-linear optical element or the wavelength of parametric amplification, the effects similar to those of the laser medium may be produced.

With the laser light generating apparatus according to the present invention, as described previously, the non-linear optical crystal element generating a high harmonics laser light from a laser light source and an amplifier element having the action of amplification for the wavelength of the laser light from the laser light source are provided within the inside of the external resonator, and the amplifier element is excited by an energy source, in such a manner that resonator loss may be compensated by the amplifier element. Consequently, the SHG conversion efficiency may be improved by compensation of the resonator loss as compared to the conventional apparatus. On the other hand, the SHG conversion efficiency may be prevented from being fluctuated by resonator loss compensation against variation in the resonator loss caused by fluctuations from one component to another, thereby rendering it possible to provide a laser light source having a high production yield.

With the above arrangement, the element having the action of amplification for the wavelength of the fundamental frequency light source arranged within the external resonator compensates the resonator loss and suppresses significant changes in the conversion efficiency caused by fluctuations in the resonator loss, such that, as a principle, the SHG conversion efficiency close to or even exceeding 100% may be achieved with respect to the fundamental frequency laser light incident on the external resonator.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A laser light generating apparatus comprising:

a first light source for generating a light beam of a fundamental wavelength;

an external resonator optically coupled to said first light source to receive said fundamental wavelength light beam, and comprising a plurality of reflection devices having high reflectance with respect to said fundamental wavelength of said light beam;

a non-linear optical crystal element located within said resonator for generating a light beam of harmonic wave length when said light beam of said fundamental wavelength is input thereto;

an amplifier element located within said resonator for amplifying said light beam of said fundamental wavelength therein, and an energy source coupled to said amplifier and located external to said resonator for exciting said amplifier element.

2. The laser light generating apparatus according to claim 1, further comprising a first optical element located on an optical axis of said light beam of said fundamental wavelength for mode matching said light beam to said external resonator.

3. The laser light generating apparatus according to claim 2, further comprising detection means for detecting said light beam of said fundamental wavelength passed through said first optical element and a control means for adjusting a position of a first optical reflector element to control a resonator length of said resonator in response to a signal output from said detection means.

4. The laser light generating apparatus according to claim 1, said amplifier element is a solid state laser medium.

5. The laser light generating apparatus according to claim 1, said energy source comprising a second light source for exciting said amplifier element and a coupling element for directing a light beam output from said second light source to said amplifier element whereby conversion efficiency of said non-linear crystal element is substantially improved while fluctuating losses induced in said resonator are substantially suppressed.

6. A laser light generating apparatus comprising:

a first laser light source for generating a light beam of a fundamental wavelength;

a resonator comprising a pair of reflection devices having high reflectance with respect to said fundamental wavelength of said light beam, said resonator optically coupled to said first light source to receive said fundamental wavelength beam;

a non-linear optical crystal element located within said resonator for generating a light beam of a wavelength harmonic to said fundamental wavelength when said light beam of said fundamental wavelength is input thereto;

an amplifier element located within said resonator on an optical axis of said light beam of said fundamental wavelength positioned to amplify said light beam of said fundamental wavelength therein, and an energy source optically coupled to said resonator for exciting said amplifier element.

7. The laser light generating apparatus according to claim 6, said energy source comprising a second laser light source for exciting said amplifier element located outside said resonator but optically coupled to said resonator.

8. The laser light generating apparatus according to claim 6, further comprising concave inside surfaces of said reflection devices incorporated in said resonator, wherein one of said reflection devices is provided at a side of said non-linear optical crystal element where said light beam of said fundamental wavelength is input and the other of said reflection devices is provided at a side of said amplifier element where said light beam of said fundamental wavelength is output.

9. An external resonator loss-compensated second or higher order harmonic laser generating apparatus comprising:

first light source means for generating a coherent light beam having a first wavelength; external resonator means, comprising:
 a) first and second cooperating reflective means, each highly reflective of said first wavelength,
 b) non-linear crystal means for receiving said first wavelength and producing a second wavelength light beam, and
 c) optical amplifier means for amplifying said first wavelength, for inputting said first wavelength and outputting a second wavelength, said second wavelength being a second or higher order harmonic of said first wavelength; and amplifier input energy source means for actuating said optical amplifier with a third wavelength and offsetting an energy loss within said external resonator means.

10. The apparatus of claim 9 further comprising energy source reflector means positioned between said energy source means and said resonator means for reflecting said third wavelength and transmitting said second wavelength.

11. The apparatus of claim 10 further characterized in that said first reflective means is formed on an upstream side of said non-linear crystal means adjacent to said light source means, and said second reflective means is formed on a downstream side of said optical amplifier means adjacent to said energy source reflector means.

12. The apparatus of claim 9 wherein said first light source means generates a second order harmonic coherent beam of a solid state laser fundamental frequency.

* * * * *